United States Patent
Oesterling et al.

(10) Patent No.: US 7,277,736 B2
(45) Date of Patent: Oct. 2, 2007

(54) METHOD AND SYSTEM FOR MANAGING A TELEMATICS UNIT BASED ON VEHICLE POWER LEVEL

(75) Inventors: Christopher L. Oesterling, Troy, MI (US); Daniel C. McGarry, Oxford, MI (US)

(73) Assignee: General Motors Corporation, Detroit, MI (US)

( * ) Notice: Subject to any disclaimer, the term of this patent is extended or adjusted under 35 U.S.C. 154(b) by 497 days.

(21) Appl. No.: 10/740,730

(22) Filed: Dec. 19, 2003

(65) Prior Publication Data

US 2005/0136991 A1 Jun. 23, 2005

(51) Int. Cl.
*H04B 1/38* (2006.01)

(52) U.S. Cl. .................. 455/572; 455/343.1

(58) Field of Classification Search ........... 455/572, 455/573, 574, 343.1, 127.1
See application file for complete search history.

(56) References Cited

U.S. PATENT DOCUMENTS 6,721,580 B1 * 4/2004 Moon .................. 455/574
2005/0272482 A1 * 12/2005 Shinoda .............. 455/574

* cited by examiner

*Primary Examiner*—Lee Nguyen

(57) ABSTRACT

The present invention provides a method for managing telematics unit within a telematics equipped mobile vehicle based on vehicle power level. The method includes receiving at least one mobile vehicle sensor input, determining a mobile vehicle system power value based on the at least one received vehicle sensor input, and operating the telematics unit based on the determined mobile vehicle system power value. The step of operating the telematics unit based on the determined mobile vehicle system power value may include comparing the determined mobile vehicle system power value to a mobile vehicle system target power level, determining if the difference between the mobile vehicle system power value and the mobile vehicle system target power level exceeds a system power level threshold, and initiating a standard operating mode interrupt when the system power level threshold is exceeded.

15 Claims, 3 Drawing Sheets

METHOD AND SYSTEM FOR MANAGING A TELEMATICS UNIT BASED ON VEHICLE POWER LEVEL

FIELD OF THE INVENTION

This invention relates generally to wireless communications with a mobile vehicle. More specifically, the invention relates to a method and system for managing a telematics unit within a telematics equipped mobile vehicle based on vehicle power level.

BACKGROUND OF THE INVENTION

The opportunity to utilize wireless features in a mobile vehicle is ever increasing as the automobile is being transformed into a communications and entertainment platform as well as a transportation platform. Wireless features include wireless vehicle communication, networking, maintenance and diagnostic services for a mobile vehicle.

Typically, conventional wireless systems within mobile vehicles (e.g. telematics units) provide voice communication. Recently, these wireless systems have been utilized to update systems within telematics units, such as, for example radio station presets. Telematics units contain wireless network access devices, such as, for example embedded digital and analog mobile telephones. Similar to other conventional wireless systems, telematics units within mobile vehicles are required to regularly register with a wireless carrier system. This registration is called a registration request. The registration request, when successfully completed via an acknowledgement from the wireless carrier, indicates that the network access device portion of the telematics unit is operational.

While the process of performing an individual registration request does not consume a great deal of system power, prolonged operation of registration requests, such as, for example every ten minutes will result in a system energy level reduction below an acceptable threshold. Typically, mobile vehicles are operated frequently enough that the system energy level does not drop below the acceptable threshold. Additionally, a time limit (e.g. 48 hours) is generally established at which point the telematics unit ceases substantially all activity so as to maintain enough energy within the system to operate other more necessary activities, such as, for example a security system and a mobile vehicle starting system.

Unfortunately, differing circumstances, such as, ambient temperature may result in energy levels within the power system decreasing at unpredictable rates. For example, if a mobile vehicle is operating in a low temperature environment, the energy level within the system may deteriorate to an unacceptable level prior to the expiration of the aforementioned time limit.

The present invention addresses these and other issues and advances the state of the art.

SUMMARY OF THE INVENTION

One aspect of the invention includes a method for operating a telematics unit within a mobile vehicle communication system. The method includes receiving at least one mobile vehicle sensor input, determining a mobile vehicle system power value based on the at least one received vehicle sensor input, and operating the telematics unit based on the determined mobile vehicle system power value.

In accordance with another aspect of the invention, a computer readable medium storing a computer program includes: computer readable code for processing at least one received mobile vehicle sensor input; computer readable code for determining a mobile vehicle system power value based on the at least one received vehicle sensor input; and computer readable code for operating the telematics unit based on the determined mobile vehicle system power value.

In accordance with yet another aspect of the invention, a system for operating a telematics unit within a mobile vehicle is provided. The system includes means for receiving at least one mobile vehicle sensor input. Means for determining a mobile vehicle system power value based on the at least one received vehicle sensor input is provided. Means for operating the telematics unit based on the determined mobile vehicle system power value is also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
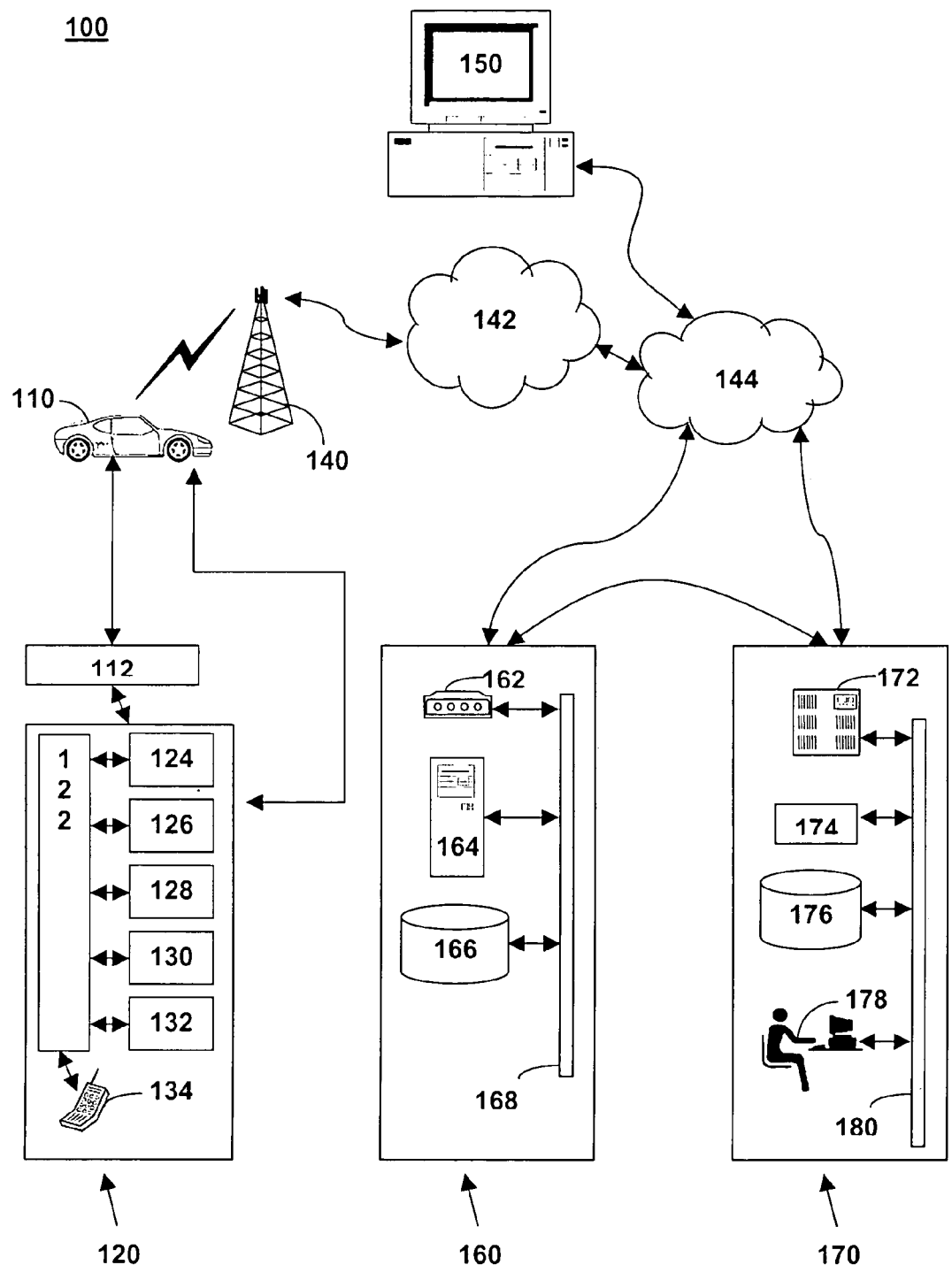
FIG. 1 illustrates an operating environment for implementing wireless communication within a mobile vehicle communication system.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications. Vehicle network 112 is also referred to as a bus, or a vehicle bus.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example speakers 132. Telematics unit 120 may include additional components not relevant to the present discussion.

In one embodiment, DSP 122 is implemented as a microcontroller, controller, host processor, or vehicle communications processor. In an example, DSP 122 is implemented as an application specific integrated circuit (ASIC). In another embodiment, DSP 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone.

DSP 122 executes various computer programs that affect programming and operational modes of electronic and mechanical systems within MVCU 110. DSP 122 controls communications (e.g. call signals) between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from DSP 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user-preferences for MVCU 110. In an example, a client utilizes computer 150 to provide radio station presets as user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140.

Figure 2:
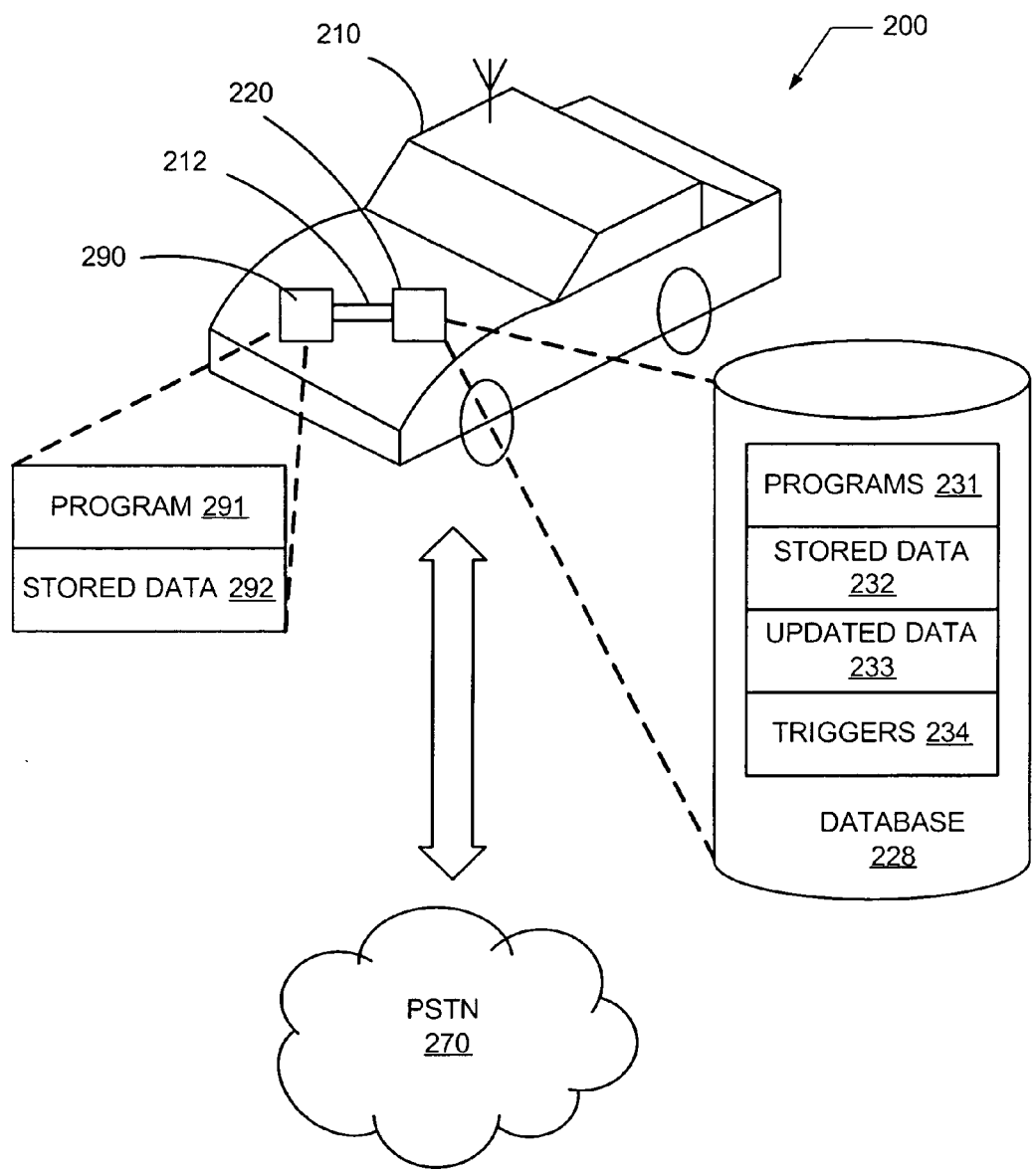
FIG. 2 is a block diagram of telematics based system in accordance with an embodiment of the present invention.

FIG. 2 is a block diagram of a telematics based system in accordance with an embodiment of the present invention. FIG. 2 shows a telematics based system 200 for managing a telematics unit within a telematics equipped mobile vehicle based on vehicle power level.

In FIG. 2, the system includes a mobile vehicle 210 having a telematics unit 220 coupled to one or more vehicle system modules 290 via a vehicle communication bus 212, and a communication network 270, such as, for example the wireless carrier 140 as described with reference to FIG. 1. Telematics unit 220 further includes a database 228 that contains programs 231, stored data 232, updated data 233 and triggers 234. Vehicle system module (VSM) 290 further includes a program 291 and stored data 292. In FIG. 2, the elements are presented for illustrative purposes and are not intended to be limiting. Telematics based system 200 may include additional components not relevant to the present discussion.

Telematics unit 220 is any telematics device enabled for operation with a telematics service provider, such as, for example telematics unit 120 as described with reference to FIG. 1. Telematics unit 220 in vehicle 210 is in communication with communication network 270. Telematics unit 220 includes volatile and non-volatile memory components for storing data and programs. In one embodiment, memory components in telematics unit 220 contain database 228.

Database 228 includes one or more programs 231 for operating telematics unit 220, such as, for managing the telematics unit based on vehicle power level. In operation, a program module receives at least one mobile vehicle sensor input from a vehicle system module (e.g. VSM 290 described below) at updated data 233. In one embodiment, the mobile vehicle sensor input includes system energy level information, such as, system voltage level information or system current level information. The program module determines a mobile vehicle system power value based on the received vehicle sensor input and operates the telematics unit based on the determined mobile vehicle system power value. In an example, the mobile vehicle sensor input is cached within updated data 233. The mobile vehicle sensor input is stored at stored data 232.

In one embodiment, the program module operates the telematics unit based on the determined mobile vehicle system power value by comparing the determined mobile vehicle system power value to a mobile vehicle system target power level, determining if the difference between the mobile vehicle system power value and the mobile vehicle system target power level exceeds a system power level threshold, and initiating a standard operating mode interrupt when the system power level threshold is exceeded. In this embodiment, the standard operating mode operates the telematics unit in a low-power configuration, such as, for example operating the telematics unit in a "sleep" mode until a registration request is initiated.

In an example, when the mobile vehicle is not operating and the telematics unit is not in operation, the standard operating mode operates the telematics unit in the low-power configuration. Telematics unit 220 receives at least one mobile vehicle sensor input from a vehicle system module (e.g. VSM 290 described below), such as system voltage level. Program 231 determines a mobile vehicle system power value based on the received system voltage level and operates the telematics unit based on the determined mobile vehicle system power value. Program 231 operates the telematics unit based on the determined mobile vehicle system power value by comparing the determined mobile vehicle system power value to a mobile vehicle system target power level, determining if the difference between the mobile vehicle system power value and the mobile vehicle system target power level exceeds a system power level threshold, and initiating a standard operating mode interrupt when the system power level threshold is exceeded. In this application, the term "exceeds" is defined broadly, and includes instances where the measurement is greater than a target as well as instances where the measurement is less than a target. In another embodiment, a time value, such as, for example a standard operating mode time increment value is also included as a terminal temporal endpoint for operating the telematics unit in the low-power configuration.

Vehicle system module (VSM) 290 is any vehicle system control module having software and hardware components for operating, controlling or monitoring one or more vehicle systems. In one embodiment, VSM 290 is a mobile vehicle sensor module, such as, for example a system energy level sensor including a system voltage level sensor or a system current level sensor. An example of a system energy level sensor is a dash integration module, as is know in the art, that provides system energy level information to the telematics unit. In another embodiment, VSM 290 is a global positioning system (GPS) module, such as, for example GPS unit 126 of FIG. 1. In yet another embodiment, VSM 290 is a controller for controlling a vehicle system such as, for example, a powertrain control module that monitors or controls vehicle drivetrain functions.

Vehicle system module 290 contains one or more processors, one or more memory devices and one or more connection ports. In one embodiment, VSM 290 includes a software switch for scanning received information, such as, for example sensor information to identify that data has been received. VSM 290 is coupled to a vehicle communication bus 212, and therefore to any other device that is also coupled to vehicle communication bus 212. The vehicle communication bus is also referred to as a vehicle communication network. In one embodiment, VSM 290 is directly coupled to telematics unit 220, such as, for example vehicle communication bus 212 coupling telematics unit 220 to vehicle system modules 290. In an example, vehicle communication bus 212 is a vehicle communication network 112 as described in FIG. 1, above. In another embodiment, VSM 290 is indirectly coupled to telematics unit 220.

VSM 290 includes one or more programs 291 and stored data 292 stored in memory. In one embodiment, program 291 includes software for receiving sensor information and storing the received sensor information at stored data 292. In this embodiment, the received sensor information is passed to telematics unit 220 for processing, such as, for example to be utilized in managing the telematics unit.

Figure 3:
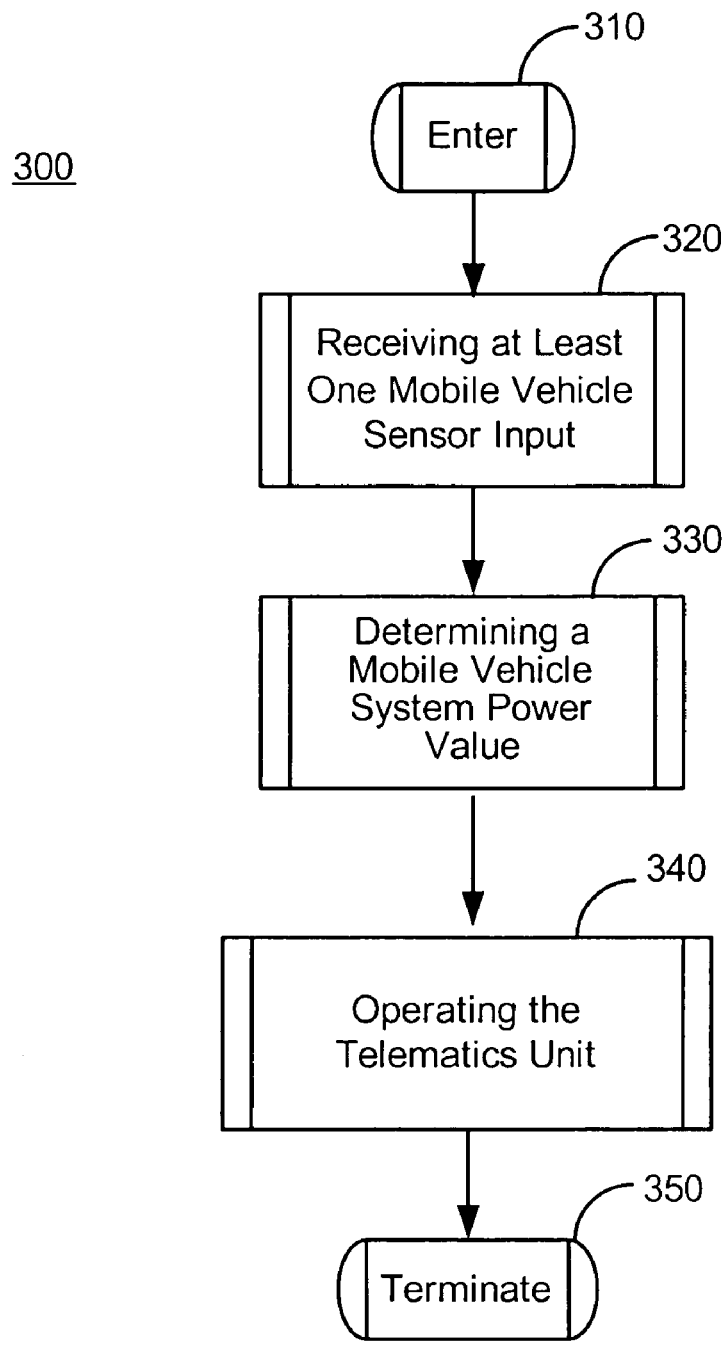
FIG. 3 is a flow diagram of one embodiment of a method of managing a telematics unit within a mobile vehicle based on vehicle power level, in accordance with the present invention.

FIG. 3 is a flow diagram of an embodiment of a method of managing a telematics unit within a telematics equipped mobile vehicle based on vehicle power level. In FIG. 3, method 300 may utilize one or more systems detailed in FIGS. 1 and 2, above. The present invention can also take the form of a computer usable medium including a program for configuring an electronic module within a vehicle. The program stored in the computer usable medium includes computer program code for executing the method steps described in FIG. 3. In FIG. 3, method 300 begins at step 310.

At step 320, at least one mobile vehicle sensor input is received. In one embodiment, the at least one mobile vehicle sensor input is received at the telematics unit from a mobile vehicle sensor. Examples of mobile vehicle sensors include, but are not limited to, a system energy level sensor, a system voltage level sensor, a system current level sensor, and a temperature sensor. In another embodiment, step 320 further includes monitoring at least one mobile vehicle sensor. In one embodiment, measurements effected while practicing the invention may be taken while the battery is under electrical load. In another embodiment, the measurements are taken based on an open circuit.

At step 330, a mobile vehicle system power value is determined based on the at least one received vehicle sensor input. In one embodiment, the system power value is an expression of power available for use within the system.

At step 340, the telematics unit is operated based on the determined mobile vehicle system power value. In one embodiment, operating the telematics unit based on the determined mobile vehicle system power value includes comparing the determined mobile vehicle system power value to a mobile vehicle system target power level, determining if the difference between the mobile vehicle system power value and the mobile vehicle system target power level exceeds a system power level threshold, and initiating a standard operating mode interrupt when the system power level threshold is exceeded. In an example, the system power level threshold is a predetermined value.

In an example, initiating the standard operating mode interrupt when the system power level threshold is exceeded includes determining if mobile vehicle system power value is greater than the mobile vehicle system target power level by the system power level threshold, determining if a standard operating mode time increment value has been exceeded, and continuing standard operating mode responsive to the threshold determination and the increment value determination.

In another example, initiating the standard operating mode interrupt when the system power level threshold is exceeded includes determining if mobile vehicle system power value is less than the mobile vehicle system target power level by the system power level threshold, determining if a standard operating mode time increment value has not been exceeded, and initiating a telematics unit power down interrupt responsive to threshold determination and the increment value determination.

In yet another embodiment, method 300 further includes determining the system power level threshold based on the at least one received vehicle sensor input. In one embodiment, operating the telematics unit based on the determined mobile vehicle system power value and the determined system power level threshold includes comparing the determined mobile vehicle system power value to a mobile vehicle system target power level, determining if the difference between the mobile vehicle system power value and the mobile vehicle system target power level exceeds a system power level threshold, and initiating a standard operating mode interrupt when the system power level threshold is exceeded. Examples of mobile vehicle sensors include a temperature sensor, a system energy level sensor, a system voltage level sensor, and a system current level sensor.

At step 350, the method is terminated.

The above-described methods and implementation for managing a telematics unit within a telematics equipped mobile vehicle based on vehicle power level are example methods and implementations. These methods and implementations illustrate one possible approach for managing a telematics unit within a telematics equipped mobile vehicle based on vehicle power level. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method for operating a telematics unit within a mobile vehicle communication system, the method comprising:
   receiving at least one mobile vehicle sensor input;
   determining a mobile vehicle system power value based on the at least one received vehicle sensor input;
   comparing the mobile vehicle system power value to a mobile vehicle system target power level; and
   determining a temporal endpoint at which the telematics unit interrupts a standard operating mode based on the comparison.

2. The method of claim 1, further comprising: monitoring at least one mobile vehicle sensor.

3. The method of claim 2, wherein the at least one mobile vehicle sensor is selected from the group consisting of: a system energy level sensor, a system voltage level sensor, a system current level sensor, and a temperature sensor.

4. The method of claim 1, wherein the comparing step further comprises:
   determining if the difference between the mobile vehicle system power value and the mobile vehicle system target power level is greater than a system power level threshold, and, if so, continuing operation of the telematics unit in the standard operating mode; and
   determining if the difference between the mobile vehicle system power value and the mobile vehicle system target power level is less than a system power level threshold, and, if so, interrupting the standard operating mode.

5. The method of claim 4, wherein the system power level threshold is a predetermined value.

6. The method of claim 1, further comprising:
   determining a system power level threshold based on the at least one received vehicle sensor input.

7. The method of claim 1, further comprising the steps of receiving system energy level information from the at least one mobile vehicle sensor and determining the mobile vehicle system power value based on the system energy level information.

8. The method of claim 1, wherein the standard operating mode operates the telematics unit in a low-power configuration.

9. A computer readable medium for operating a telematics unit within a mobile vehicle, comprising:
   computer readable code for processing at least one received mobile vehicle sensor input;
   computer readable code for determining a mobile vehicle system power value based on the at least one received vehicle sensor input;
   computer readable code for comparing the mobile vehicle system power value to a mobile vehicle system target power level; and
   computer readable code for determining a temporal endpoint at which the telematics unit interrupts a standard operating mode based on the comparison.

10. The method of claim 9, further comprising: computer readable code for monitoring at least one mobile vehicle sensor.

11. The computer readable medium of claim 10, wherein the at least one mobile vehicle sensor is selected from the group consisting of: a system energy level sensor, a system voltage level sensor, a system current level sensor, and a temperature sensor.

12. A method for operating a telematics unit within a mobile vehicle communication system, comprising the steps of:
   operating the telematics unit in a low-power configuration;
   receiving at least one mobile vehicle sensor input;
   determining a mobile vehicle system power value based on the at least one received vehicle sensor input;
   comparing the mobile vehicle system power value to a mobile vehicle system target power level; and
   determining whether to interrupt or continue operation of the telematics unit in the low-power configuration based on the comparison.

13. The method of claim 12, wherein the step of determining whether to interrupt or continue further comprises determining a terminal temporal endpoint for operating the telematics unit in the low-power configuration based on the comparison.

14. The method of claim 13, wherein the step of determining a terminal temporal endpoint further comprises determining a time increment value during which operation of the telematics unit in the low-power configuration is continued.

15. The method of claim 12, farther comprising the step of powering down the telematics unit if the determination is made to interrupt operation of the telematics unit.

* * * * *